United States Patent
Bodvarsson et al.

(10) Patent No.: US 12,069,440 B2
(45) Date of Patent: Aug. 20, 2024

(54) HEARING DEVICE COMPRISING A BATTERY MODULE AND A METHOD OF MANUFACTURING A BATTERY MODULE FOR A HEARING DEVICE

(71) Applicant: GN HEARING A/S, Ballerup (DK)

(72) Inventors: Thorvaldur Oli Bodvarsson, Ballerup (DK); Kamila Piotrowska, Ballerup (DK); Emil Holm Knudsen, Ballerup (DK)

(73) Assignee: GN Hearing 2 A/S, Ballerup (DK)

( * ) Notice: Subject to any disclaimer, the term of this patent is extended or adjusted under 35 U.S.C. 154(b) by 0 days.

(21) Appl. No.: 17/673,747

(22) Filed: Feb. 16, 2022

(65) Prior Publication Data

US 2022/0272466 A1 Aug. 25, 2022

(30) Foreign Application Priority Data

Feb. 22, 2021 (DK) .............................. PA202170082

(51) Int. Cl.
*H04R 25/00* (2006.01)

(52) U.S. Cl.
CPC .......... *H04R 25/602* (2013.01); *H04R 25/554* (2013.01); *H04R 25/609* (2019.05)

(58) Field of Classification Search
CPC ... H04R 25/602; H04R 25/609; H04R 25/554
USPC .......................................................... 381/322
See application file for complete search history.

(56) References Cited

U.S. PATENT DOCUMENTS

| 6,208,741 B1 | 3/2001 | Shennib et al. |
| 2007/0017749 A1 | 1/2007 | Dold et al. |
| 2009/0010462 A1 | 1/2009 | Ekchian et al. |
| 2011/0091753 A1* | 4/2011 | Wang .................. H01M 50/109 |
| | | 429/94 |

FOREIGN PATENT DOCUMENTS

| CN | 101065859 A | * 10/2007 | ......... C23C 18/1696 |
| EP | 0996179 | 4/2000 | |
| EP | 2871864 | 5/2015 | |
| WO | WO 00/32009 | 6/2000 | |
| WO | WO 2020/158022 | 8/2020 | |

OTHER PUBLICATIONS

CN101065859A. Translation (Year: 2007).*
Technical examination report dated Aug. 26, 2021, for Danish patent application No. PA 2021 70082.
Extended European Search Report for EP Patent Appln. No. 22157018.7 dated Jul. 22, 2022.
2nd Technical Examination for Danish Patent Appln. No. PA 2021 70082 dated Feb. 25, 2022.
Foreign Exam Report for EP Patent Appln. No. 22157018.7 dated May 10, 2024.

* cited by examiner

*Primary Examiner* — Phylesha Dabney
(74) *Attorney, Agent, or Firm* — Vista IP Law Group, LLP

(57) ABSTRACT

Disclosed is a hearing device comprising a battery module. The battery module comprises a battery for powering the hearing device; a conductor unit for providing electrical connection to the battery; a conductive adhesive arranged between the battery and the conductor unit for connecting the conductor unit to the battery to form a battery component; and a coating provided at least partly around the battery component to form the battery module.

22 Claims, 3 Drawing Sheets

HEARING DEVICE COMPRISING A BATTERY MODULE AND A METHOD OF MANUFACTURING A BATTERY MODULE FOR A HEARING DEVICE

RELATED APPLICATION DATA

This application claims priority to, and the benefit of, Danish Patent Application No. PA 2021 70082 filed on Feb. 22, 2021. The entire disclosure of the above application is expressly incorporated by reference herein.

FIELD

The present disclosure relates to a hearing device comprising a battery module and a method of manufacturing a battery module for a hearing device.

BACKGROUND

Hearing devices such as wireless hearing aids and earbuds have become more popular over the past years. Such wireless hearing devices typically comprise at least one battery to power them. However, the battery may lose its contact with the hearing device, it may leak, it may be replaced or it may be reused in another hearing device. Therefore, there is still a need for an improved battery component for use in the hearing devices. In addition, there is also a need for an improved method of manufacturing a battery component for the hearing device that addresses the abovementioned problems.

SUMMARY

Disclosed is a hearing device. The hearing device comprises a battery module. The battery module comprises a battery for powering the hearing device. The battery module comprises a conductor unit for providing electrical connection to the battery. The battery module comprises a conductive adhesive arranged between the battery and the conductor unit for connecting the conductor unit to the battery to form a battery component. The battery module comprises a coating provided at least partly around the battery component to form the battery module.

Also disclosed is a method of manufacturing a battery module for a hearing device. The method comprises the steps of providing a battery for powering the hearing device, a conductor unit for providing electrical connection to the battery and a conductive adhesive. The method comprises the step of connecting the conductive adhesive to the battery. The method comprises the step of connecting the conductor unit to the conductive adhesive to form a battery component. The method comprises the step of coating the battery component to form the battery module.

The hearing device and the method as disclosed provide a simple, compact, cost-effective and robust battery module and hence a hearing device. The conductive adhesive and the coating allow for mechanical fixation of the battery module in a simple, compact and cost-effective manner. Thereby, the conductive adhesive and the coating prevent or at least mitigate the battery losing its contact with the conductor unit and hence with the hearing device. In the conventional battery modules of the hearing devices, typically extra support parts e.g. foams and/or springs are used for the mechanical fixation which are more expensive, require more parts and are more complex, than the conductive adhesive and the coating and also occupy more space.

In addition, the hearing device and the method as disclosed provide an improved protection for the battery module against e.g. water, moist, earwax and other human secretion products and dirt. In other words, the coating of the battery module provides an improved protection for the battery module against e.g. water, moist, earwax and other human secretion products and dirt entering into the battery module. An example of advantages of said coating is that it prevents or at least mitigates corrosion or malfunctioning e.g. short circuit of the battery. Thereby, said coating increases the lifetime of the battery and hence allows for an even more cost-effective battery module. In addition, the hearing device and the method as disclosed provide an improved protection for a user wearing said hearing device i.e. provides a safer battery module and hence a safer hearing device. For instance, said coating prevents or at least mitigates a potential leakage of the battery i.e. a battery electrolyte of the battery leaking out.

The hearing device and the method as disclosed further facilitate repair and exchange of various parts of the battery module and hence the hearing device. For example, if the battery needs to be replaced or exchanged, either the battery module or the battery of the battery module may be exchanged by e.g. detaching the battery module from the hearing device housing or detaching the battery from the conductive adhesive and attaching another battery. Thereby, other parts of the battery module may be reused. Another example is when a housing of the hearing device is exchanged, the battery module or the battery of the battery module may be reused. Thereby, such exchange and reuse of the battery module or the battery allows for further reducing the cost of the battery module and the hearing device.

The battery module comprises a battery for powering the hearing device. The battery may comprise one or a plurality of batteries. The battery may be any type of battery suitable for a hearing device. The battery may be rechargeable. The battery may be a coin-shaped cell type battery with round positive and negative terminals. The battery can be recharged using wireless power transfer and a number of different technologies can be used such as inductive coupling, resonant inductive coupling, capacitive coupling, magneto dynamic coupling, microwaves, light waves, etc. The rechargeable batteries may be e.g. a lithium-ion battery, a silver-zinc battery, a solid state battery etc. The battery can be recharged using terminal or contact charging. For the terminal or contact power transfer a number of different technologies and battery types can be used, such as alkaline batteries, galvanic charging etc.

The battery module comprises a conductor unit for providing electrical connection to the battery e.g. for use of the battery and recharging of the battery. The conductor unit may comprise any type of conductor units. The conductor unit may have two portions arranged on the conductive adhesive parts on the positive and negative terminals of the battery. These portions of the conductor unit may be round or may have any other suitable shape. The conductor unit may comprise a printed circuit board e.g. a printed circuit board for a battery, which in the following is called a battery printed circuit board. The battery printed circuit board may be flexible. The battery printed circuit board may be rigid. The battery printed circuit board may comprise a flexible board with rigid panels or a rigid board with flexible panels. For instance, the battery printed circuit board may comprise two main panels connected via a flexible board. The battery printed circuit board may comprise other components e.g. charging components. The battery printed circuit board may be used for other components i.e. to provide electrical connection to said other components. Alternatively or in combination, the conductor unit may comprise a metal sheet or a metal plate. The conductor unit may be connected to a main printed circuit board of the hearing device.

The battery module comprises a conductive adhesive arranged between the battery and the conductor unit for connecting the conductor unit to the battery to form a battery component. The conductive adhesive electrically connects the battery and the conductor unit. In addition, the conductive adhesive adheres the battery and the conductor unit. The conductive adhesive may be a conductive tape. The conductive adhesive may be a conductive glue. The conductive adhesive may comprise any other type of conducting adhering.

The battery module comprises a coating provided at least partly around the battery component to form the battery module. The coating provides an environmental protection for the battery against e.g. water, moist, dirt, and earwax and other human secretion products entering the battery module. The coating also environmentally protects a user of the hearing device e.g. in the case of leakage, no battery electrolyte or only little battery electrolyte leaks out. The coating may be made of a non-conductive material or a plurality of non-conductive materials. The coating may comprise a plastic. The coating may comprise a polymer. The coating may comprise a combination of the plastic and polymer. The coating may be rigid.

The hearing device may comprise a housing or a shell. The battery module may be arranged in the housing, e.g. in a compartment or in a frame in the housing.

The hearing device may be a headset, a hearing aid, a hearable etc. The hearing device may be an in-the-ear (ITE) hearing device, a receiver-in-ear (RIE) hearing device, a receiver-in-canal (RIC) hearing device, a microphone-and-receiver-in-ear (MaRIE) hearing device, a behind-the-ear (BTE) hearing device, an over-the-counter (OTC) hearing device etc, a one-size-fits-all hearing device etc.

The hearing device is configured to be worn by a user. The hearing device may be arranged at the user's ear, on the user's ear, in the user's ear, in the user's ear canal, behind the user's ear etc. The user may wear two hearing devices, one hearing device at each ear. The two hearing devices may be connected, such as wirelessly connected.

The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc.

The hearing device may comprise a first input transducer, e.g. a microphone, to generate one or more microphone output signals based on a received audio signal. The audio signal may be an analogue signal. The microphone output signal may be a digital signal. Thus, the first input transducer, e.g. microphone, or an analogue-to-digital converter, may convert the analogue audio signal into a digital microphone output signal. All the signals may be sound signals or signals comprising information about sound. The hearing device may comprise a signal processor. The one or more microphone output signals may be provided to the signal processor for processing the one or more microphone output signals. The signals may be processed such as to compensate for a user's hearing loss or hearing impairment. The signal processor may provide a modified signal. All these components may be comprised in a housing of an ITE unit or a BTE unit. The hearing device may comprise a receiver or output transducer or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in an ITE unit or in an earpiece, e.g. RIE unit or MaRIE unit. The hearing device may comprise more than one microphone, and the ITE unit or BTE unit may comprise at least one microphone and the RIE unit may also comprise at least one microphone.

The hearing device signal processor may comprise elements such as an amplifier, a compressor and/or a noise reduction system etc. The signal processor may be implemented in a signal-processing chip or a printed circuit board (PCB). The hearing device may further have a filter function, such as compensation filter for optimizing the output signal.

The hearing device may furthermore comprise a wireless communication unit or chip, such as a wireless communication circuit or a magnetic induction chip, for wireless data communication interconnected with an antenna, such as an radio frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be any hearing device, such as any hearing device compensating a hearing loss of a wearer of the hearing device, or such as any hearing device providing sound to a wearer, or such as a hearing device providing noise cancellation, or such as a hearing device providing tinnitus reduction/masking. The person skilled in the art is well aware of different kinds of hearing devices and of different options for arranging the hearing device in and/or at the ear of the hearing device wearer.

For example, the hearing device may be an In-The-Ear (ITE), Receiver-In-Canal (RIC) or Receiver-In-the-Ear (RIE or RITE) or a Microphone-and-Receiver-In-the-Ear (MaRIE) type hearing device, in which a receiver is positioned in the ear, such as in the ear canal, of a wearer during use, for example as part of an in-the-ear unit, while other hearing device components, such as a processor, a wireless communication unit, a battery, etc. are provided as an assembly and mounted in a housing of a Behind-The-Ear (BTE) unit. A plug and socket connector may connect the BTE unit and the earpiece, e.g. RIE unit or MaRIE unit.

The hearing device may comprise a RIE unit. The RIE unit typically comprises the earpiece such as a housing, a plug connector, and an electrical wire/tube connecting the plug connector and earpiece. The earpiece may comprise an in-the-ear housing, a receiver, such as a receiver configured for being provided in an ear of a user and/or a receiver being configured for being provided in an ear canal of a user, and an open or closed dome. The dome may support correct placement of the earpiece in the ear of the user. The RIE unit may comprise a microphone, a receiver, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

In some embodiments, the coating may be provided to protect the battery component and to fixate the battery component. The coating may mechanically fixate and electrically connect the conductor unit to the battery via the conductive adhesive. In other words, the coating may allow for providing the electrical connection between the conductor unit and the battery via the conductive adhesive by mechanically fixating them.

In another embodiment, the coating may be provided by deposition of a polymer onto the battery component. The coating may e.g. be provided by chemical vapor deposition (CVD) or physical vapor deposition (PVD) of the coating. A thickness of the coating may be in the range of 1 to 100 µm, such as 2-50 µm, e.g. 25 µm. The thickness of the coating may be controlled in a manner which per se is known in the art. For instance, the thickness of the coating may be controlled by the time of deposition and/or by flow of precursors forming the coating during the deposition. Examples of the coating material comprise any of or any combination of Parylene N, Parylene C, etc.

In some embodiments, the step of coating the battery component may comprise depositing a polymer at least partly around the battery component. The step of coating the battery component may e.g. comprise masking a portion of the battery component and depositing the polymer around a remaining portion of the battery component i.e. at least partly around the battery component. The masking of the portion of the battery component may be performed in a manner which per se is known in the art. For instance, a portion of the battery component may be masked by a gel, a tape or a plastic mask. Alternatively, the step of coating the battery component may comprise depositing the polymer completely around the battery component. A portion of the coating may be removed later on to form a contact between that portion of the battery component and an external component such as a main printed circuit board of the hearing device.

In some embodiments, the conductive adhesive may comprise conductive components arranged in an adhesive material. The conductive component may be conductive particles such as Nickel and/or Copper particles. The conductive component may be conductive fibers. The conductive component may be conductive fillers. The conductive components may provide electrical connection between the battery and the conductor unit. The adhesive material i.e. matrix may be an adhesive solution such as a polymeric matrix that may be compressed to provide connection among the conductive components. The adhesive material may be a pressure sensitive acrylic adhesive material. For instance, conductive fibers may be embedded into the polymeric matrix such that the matrix may act as a carrier for the conductive fibers. Another example is a pressure sensitive adhesive transfer tape with anisotropic electrical conductivity. Such pressure sensitive adhesive material may be filled with conductive particles. Such conductive particles may allow interconnection between substrates through the adhesive thickness i.e. along a normal plane of the adhesive material and may be spaced far enough apart for the product to be electrically insulating in the plane of the adhesive material such as 3M 9703 tape.

Examples of the conductive adhesive are conductive tapes, conductive glues such as silicon-based tapes comprising conductive components in the form of conductive particles. Other examples of the conductive adhesive are woven structures comprising random metal fibers arranged in an adhesive solution such as tesa 60371. Another example is plastic threads coated with any of or any combination of Nickel or Copper materials which may be arranged randomly or may be arranged in order e.g. woven structures.

In some embodiments, the conductive adhesive may be arranged at least on a positive terminal and/or a negative terminal of the battery such that the conductor unit becomes connected at least to the positive terminal and/or the negative terminal of the battery via the conductive adhesive. The conductor unit may extend between the positive terminal and negative terminal.

In some embodiments, the step of connecting the conductive adhesive to the battery comprises arranging the conductive adhesive at least on a positive terminal and/or a negative terminal of the battery such that the conductor unit becomes connected at least to the positive terminal and/or the negative terminal of the battery via the conductive adhesive.

Thereby, the conductive adhesive may be arranged at least in contact with a surface of the positive terminal and/or a surface of the negative terminal of the battery. The conductive adhesive may be arranged either on the positive terminal or on the negative terminal. In other words, conductive adhesive may be arranged either in contact with a surface of the positive terminal or in contact with a surface of the negative terminal. The conductive adhesive may be arranged on both the positive terminal and the negative terminal. In other words, the conductive adhesive may be arranged in contact with both surfaces of the positive and the negative terminals. The conductor unit may be arranged on the conductive adhesive. The conductor unit may be arranged in contact with the conductive adhesive. The conductor unit may extend between the positive terminal and the negative terminal of the battery and may contact the battery at some point.

In some embodiments, the conductor unit comprises a tail. The hearing device may comprise a main printed circuit board. The tail of the conductor unit may be connected to the main printed circuit board.

In some embodiments, the method may comprise connecting the tail of the conductor unit to the main printed circuit board.

Thereby, the conductor unit may be connected to the main printed circuit board of the hearing device via the tail. The tail of the conductor unit may be soldered to a portion of the main printed circuit board. The tail of the conductor unit may be connected by means of a flip contact or a spring contact to a portion of the main printed circuit board. The tail of the conductor unit may be connected by means of a conductive adhesive e.g. a conductive tape to a portion of the main printed circuit board. The tail of the conductor unit may be connected by any other means to a portion of the main printed circuit board. The tail of the conductor unit may be arranged at top, bottom or side panels of the conductor unit. The tail of the conductor unit may be connected to a top portion, bottom portion or side portion of the main printed circuit board of the hearing device.

The step of connecting the tail of the conductor unit to the main printed circuit board may be performed prior to the step of coating the battery component to form the battery module. In this case, the coating coats the battery component, the conductor unit tail connected to the main printed circuit board and the main printed circuit board. The step of connecting the tail of the conductor unit to the main printed circuit board may be performed subsequent to the step of coating the battery component to form the battery module. In this case, the coating coats the battery component and forms the battery module.

The main printed circuit board may comprise input transducers e.g. microphones, output transducer such as receivers and/or speakers, integrated circuits such as a signal processing unit and discrete components such as capacitors, resistors and inductors. The main printed circuit board may comprise any other components. The main printed circuit board may be flexible. The main printed circuit board may be rigid. The main printed circuit board may comprise a flexible board with rigid panels.

In some embodiments, the method of manufacturing a battery module may comprise activating the conductive adhesive to electrically connect the conductor unit to the battery. Thereby, by the step of activating the adhesive solution, the conductive adhesive may become activated and may hence provide electrical connection between the battery and the conductor unit. For instance, the step of activating the conductive adhesive may be performed by compressing the conductive adhesive. Alternatively or in combination, the step of activating the conductive adhesive may be performed by heating the conductive adhesive. The compressing of the conductive adhesive may connect the conductive components and hence connect the conductor unit to the battery to form the battery component. The heating of the conductive adhesive may improve the connection of the conductor unit to the battery and may also decrease a time of assembly. The step of activating the conductive adhesive may be performed prior to the step of connecting the conductor unit to the conductive adhesive. The step of activating the conductive adhesive may be performed subsequent to the step of connecting the conductor unit to the conductive adhesive. The step of activating the conductive adhesive by compressing may be performed by applying a pressure in the range of 2 to 50 N e.g. 5 N to the conductive adhesive. The pressure may be applied for a time in the range of 1 to 300 sec e.g. 90 sec. The step of activating the conductive adhesive by heating may be performed by heating the conductive adhesive at a temperature in the range of 40 to 100° C. e.g. 60° C.

In some embodiments, the method may comprise removing the coating from the tail of the conductor unit prior to the step of connecting the tail of the conductor unit to the main printed circuit board. For instance when the coating is deposited completely around the battery component, the coating may be removed from the tail of the conductor unit prior to the step of connecting the tail of the conductor unit to the main printed circuit board. The removing of the coating may be performed in a manner which per se is known in the art. For example, the removing of the coating may be performed by scratching a portion of the coating at the tail of the conductor unit with a tool. Another example, a portion of the coating at the tail of the conductor unit may be removed by laser. Yet another example, a portion of the coating at the tail of the conductor unit may be removed by soldering iron. A temperature of a tip of the soldering iron may be above a melting temperature of the coating in order to remove the coating.

The present disclosure relates to different aspects including the hearing device and the corresponding method of manufacturing said hearing device described above and in the following, and corresponding device parts and method steps, each yielding one or more of the benefits and advantages described in connection with the first and the second mentioned aspect, and each having one or more embodiments corresponding to the embodiments described in connection with the first and the second mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
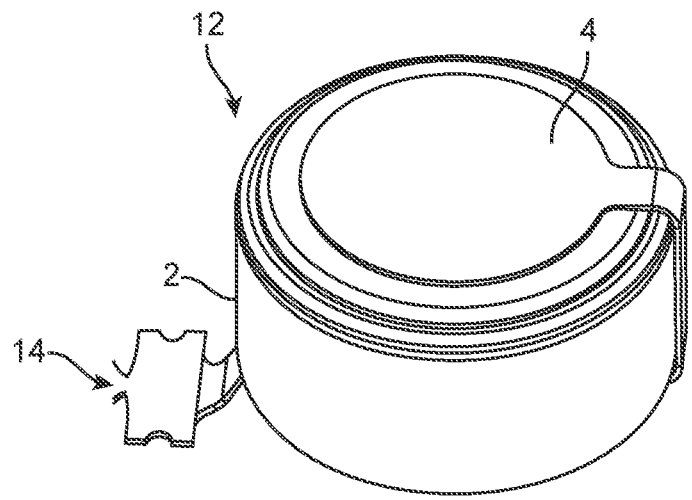
FIG. 1 schematically illustrates a perspective top view of an exemplary battery component, FIG. 2 schematically illustrates a side view of an exemplary battery component, FIG. 3 schematically illustrates a side view of an exemplary battery module of a hearing device, FIG. 4 schematically illustrates a side view of an exemplary hearing device comprising a battery module, FIG. 5 schematically illustrates a side view of another exemplary hearing device comprising a battery module, and FIG. 6 schematically illustrates a flow of steps of a method of manufacturing a battery module for a hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

Figure 2:
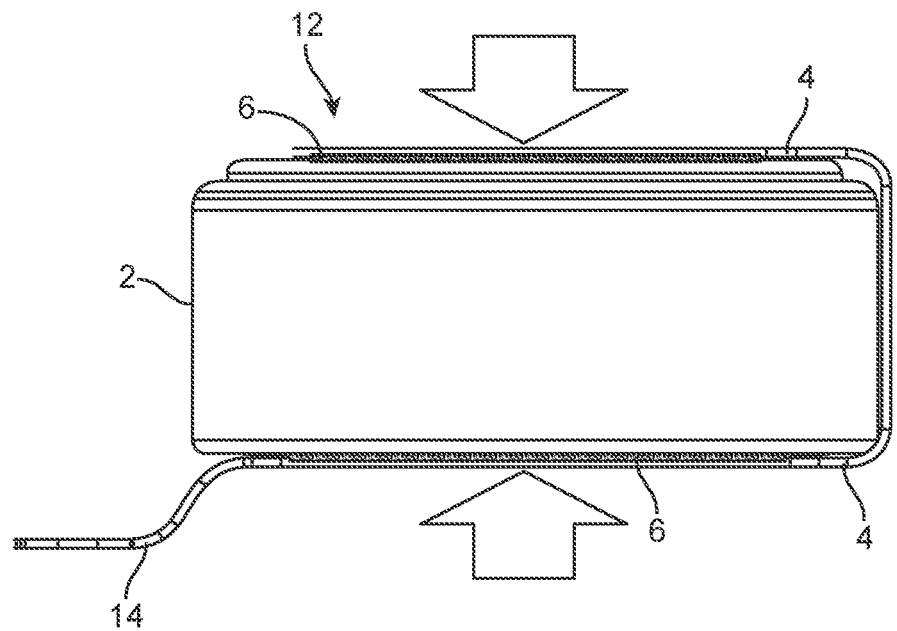

FIG. 1 schematically illustrates a perspective side view of an exemplary battery component 12 of a battery module 10. FIG. 2 schematically illustrates a side view of the exemplary battery component 12, shown in FIG. 1. The battery component 12 comprises a battery 2 for powering the hearing device 20. The battery component 12 comprises a conductor unit 4 for providing electrical connection to the battery 2. FIGS. 1 and 2 show that the conductor unit 4 comprises a tail 14. The battery component 12 comprises a conductive adhesive 6 arranged between the battery 2 and the conductor unit 4 for connecting the conductor unit 4 to the battery 2 to form the battery component 12. The battery 2, shown in FIGS. 1 and 2 is a coin-shaped cell type battery 2 with round positive and negative terminals.

Figure 3:
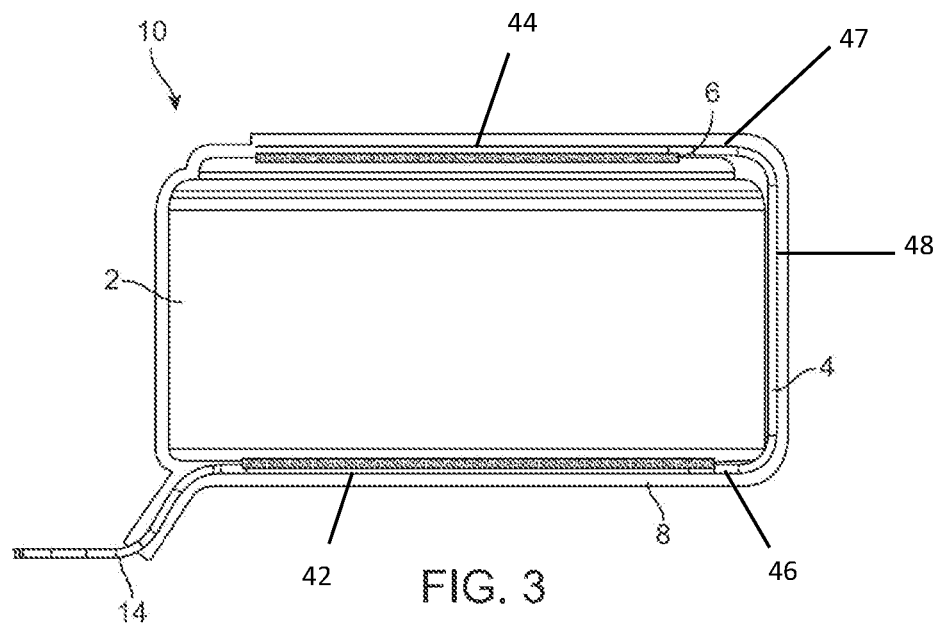

FIG. 2 shows that the conductive adhesive 6 comprises two parts, each arranged on a positive terminal and on a negative terminal of the battery 2. FIG. 1 shows that the conductor unit 4 has two round portions (electrical contacts 42, 44) arranged on the conductive adhesive 6 parts on the positive and negative terminals of the battery 2. FIGS. 1 and 2 show that the conductor unit 4 is connected to the positive terminal and the negative terminal of the battery 2 via the conductive adhesive 6. The conductor unit 4 portions (electrical contacts 42, 44) arranged on the conductive adhesive 6 parts may have any other shapes. FIGS. 1 and 2 show that the conductor unit 4 extends between the positive and the negative terminals of the battery 2. The conductive adhesive 6 parts, arranged between the battery 2 and the conductor unit 4, may have a round shape. The conductive adhesive 6 parts, arranged between the battery 2 and the conductor unit 4, may have any other shapes. As shown in FIG. 3, the conductor unit 4 has a first portion 46 extending from the electrical contact 42, a second portion 47 extending from the electrical contact 44, and a third portion 48 between the first and second portions 46, 47. FIG. 2 shows that conductive adhesive 6 has been compressed by applying a pressure in the directions of two arrows shown in FIG. 2, in order to be activated.

FIG. 3 schematically illustrates a side view of an exemplary battery module 10 of a hearing device 20. The battery module 10 comprises a battery 2 for powering the hearing device 20. The battery module 10 comprises a conductor unit 4 for providing electrical connection to the battery 2. The battery module 10 comprises a conductive adhesive 6 arranged between the battery 2 and the conductor unit 4 for connecting the conductor unit 4 to the battery 2 to form a battery component 12. The battery module 10 comprises a coating 8 provided at least partly around the battery component 12 to form the battery module 10. FIG. 3 shows that the coating 8 coats the battery component 12 except around a portion of the tail 14 i.e. a tip of the tail 14.

Figure 4:
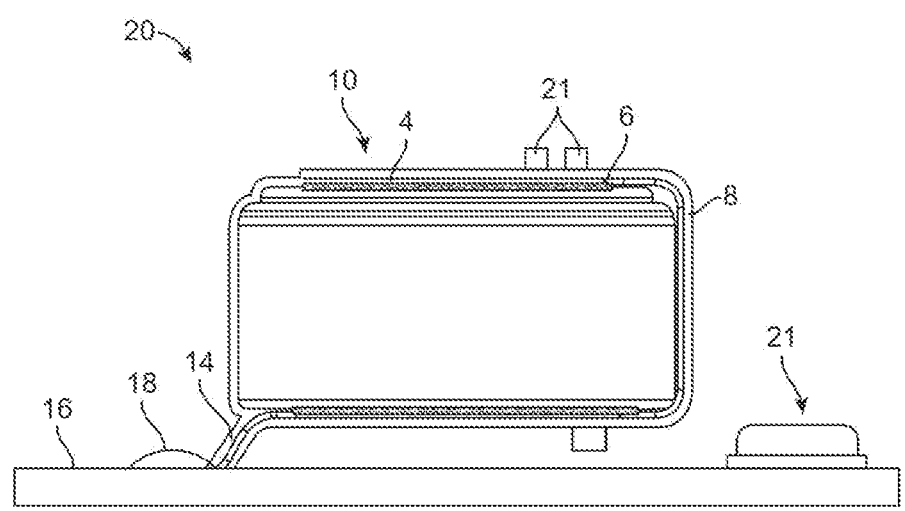

FIG. 4 schematically illustrates a side view of an exemplary hearing device 20 comprising a battery module 10. The battery module 10 shown in FIG. 4 is similar to the battery module 10 shown in FIG. 3. FIG. 4 shows that the hearing device 20 comprises a main printed circuit board 16. FIG. 4 shows that the tail 14 of the conductor unit 4 is connected to the main printed circuit board 16. FIG. 4 shows that the tail 14 of the conductor unit 4 is soldered to the main printed circuit board 16 at a soldered portion 18. FIG. 4 shows that the main printed circuit board 16 comprises other components 21. Example of such components 21 comprise microphones, receivers, speakers, integrated circuits such as signal processing units and discrete components such as capacitors, resistors and inductors. In FIG. 4, the step of connecting S37 the tail 14 of the conductor unit 4 to the main printed circuit board 16 has been performed subsequent to the step of coating S35 the battery component 12 to form the battery module 10.

Figure 5:
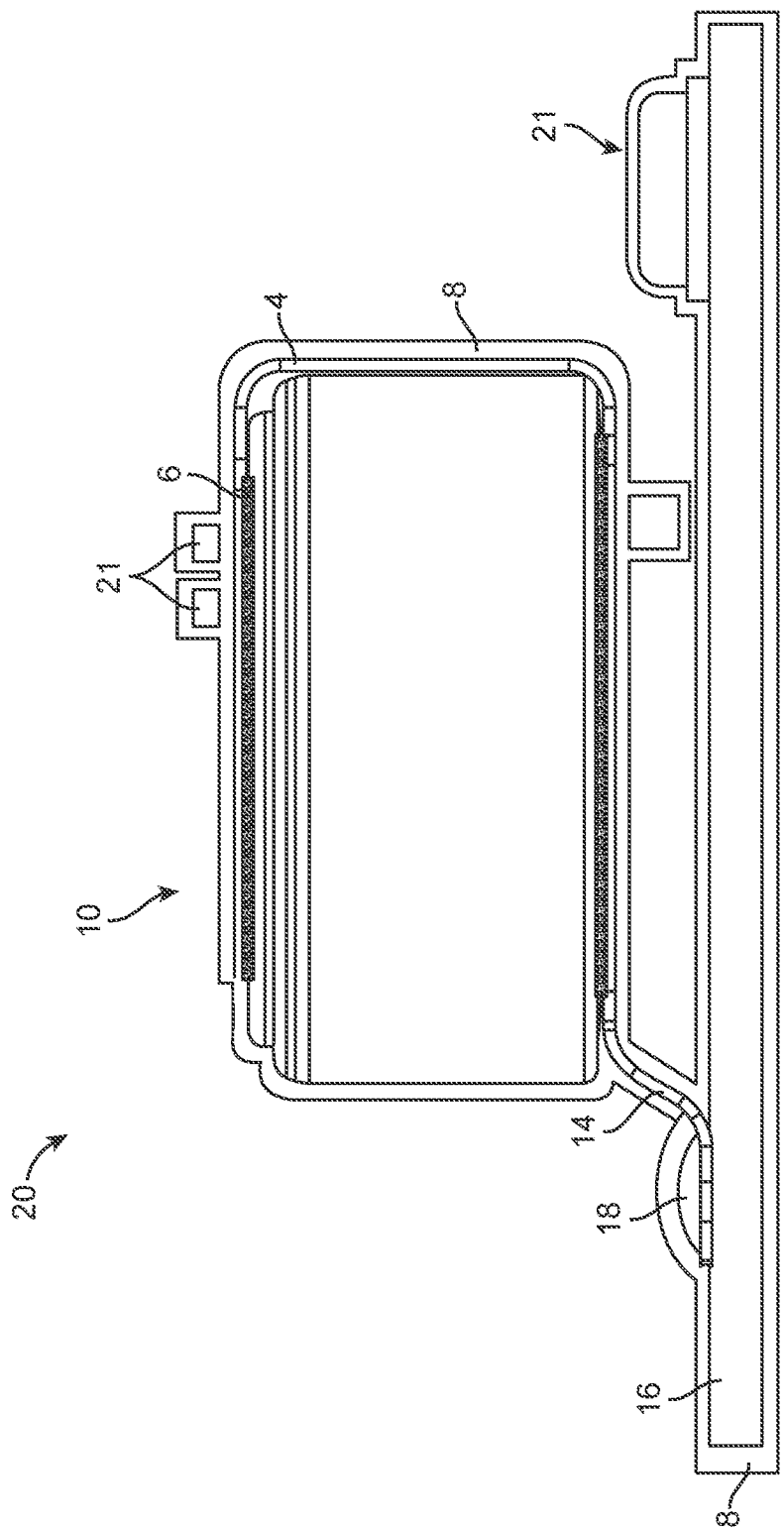

FIG. 5 schematically illustrates a side view of another exemplary hearing device 20 comprising a battery module 10. FIG. 5 shows that the tail 14 of the conductor unit 4 is connected to the main printed circuit board 16. FIG. 5 shows that the tail 14 of the conductor unit 4 is soldered to the main printed circuit board 16 at a soldered portion 18. FIG. 5 shows that the coating coats the battery component 12, the tail 14 of the conductor unit 4, connected to the main printed circuit board 16, and the main printed circuit board 16. In FIG. 5, the step of connecting S37 the tail 14 of the conductor unit 4 to the main printed circuit board 16 has been performed prior to the step of coating S35 the battery component 12 to form the battery module 10.

FIG. 6 illustrates a flow of steps of a method S30 of manufacturing a battery module 10 for a hearing device 20. The method S30 comprises the steps of providing S31 a battery 2 for powering the hearing device 20, a conductor unit 4 for providing electrical connection to the battery 2 and a conductive adhesive 6. The method S30 comprises the step of connecting S32 the conductive adhesive 6 to the battery 2. The method S30 comprises the step of connecting S33 the conductor unit 4 to the conductive adhesive 6 to form a battery component 12. The method S30 may comprise activating S34 the conductive adhesive 6 to electrically connect the conductor unit 4 to the battery 2. The step of activating S34 may be performed prior to the step of connecting S33 the conductor unit 4 to the conductive adhesive 6. The step of activating S34 may be performed subsequent to the step of connecting S33 the conductor unit 4 to the conductive adhesive 6.

FIG. 6 shows that the method S30 comprises coating S35 the battery component 12 to form the battery module 20. FIG. 6 shows that the method S30 may comprise removing S36 the coating 8 from a tail 14 of the conductor unit 4 prior to the step of connecting S37 the tail 14 of the conductor unit 4 to the main printed circuit board 16. FIG. 6 shows that the method S30 may comprise connecting S37 the tail 14 of the conductor unit 4 to the main printed circuit board 16.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:
1. A hearing device (20) comprising a battery module (10), the battery module (10) comprising:
   a battery (2) for powering the hearing device (20);
   a conductor unit (4) for providing electrical connection to the battery (2);
   a conductive adhesive (6) arranged between the battery (2) and the conductor unit (4) for connecting the conductor unit (4) to the battery (2) to form a battery component (12); and
   a coating (8) provided at least partly around the battery (12) component to form the battery module (10).
2. The hearing device (20) according to item 1, wherein the coating (8) is provided to protect the battery component (12) and to fixate the battery component (12).
3. The hearing device (20) according to item 1 or 2, wherein the coating (8) is provided by deposition of a polymer onto the battery component (12).
4. The hearing device (20) according to any of the preceding items, wherein the conductive adhesive (6) comprises conductive components arranged in an adhesive material.
5. The hearing device (20) according to any of the preceding items, wherein the conductive adhesive (6) is arranged at least on a positive terminal and/or a negative terminal of the battery (2) such that the conductor unit (4) becomes connected at least to the positive terminal and/or the negative terminal of the battery (2) via the conductive adhesive (6), and wherein the conductor unit (4) extends between the positive terminal and negative terminal.
6. The hearing device (20) according to any of the preceding items, wherein the conductor unit (4) comprises a tail (14), and wherein the hearing device (20) comprises a main printed circuit board (16), and wherein the tail (14) of the conductor unit (4) is connected to the main printed circuit board (16).
7. The hearing device according to any of the preceding items, wherein the conductor unit (4) comprises a printed circuit board.
8. A method (S30) of manufacturing a battery module (10) for a hearing device (20), the method (S30) comprising the steps of:

providing (S31) a battery (2) for powering the hearing device (20), a conductor unit (4) for providing electrical connection to the battery (2) and a conductive adhesive (6);
connecting (S32) the conductive adhesive (6) to the battery (2),
connecting (S33) the conductor unit (4) to the conductive adhesive (6) to form a battery component (12); and
coating (S35) the battery component (12) to form the battery module (20).

9. The method (S30) of manufacturing a battery module (10) according to item 8, the method (S30) comprising activating (S34) the conductive adhesive (6) to electrically connect the conductor unit (4) to the battery (2).

10. The method (S30) of manufacturing a battery module (10) according to item 8 or 9, wherein the step of coating (S35) the battery component (12) comprises depositing a polymer at least partly around the battery component (12).

11. The method (S30) of manufacturing a battery module (10) according to any of the items 8-10, wherein the step of connecting (S32) the conductive adhesive (6) to the battery (2) comprises:
arranging the conductive adhesive (6) at least on a positive terminal and/or a negative terminal of the battery (2) such that the conductor unit (4) becomes connected at least to the positive terminal and/or the negative terminal of the battery (2) via the conductive adhesive (6).

12. The method (S30) of manufacturing a battery module (10) according to any of the items 8-11, wherein the conductor unit (4) comprises a tail (14) and the hearing device (20) comprises a main printed circuit board (16), and wherein the method (S30) comprises connecting (S37) the tail (14) of the conductor unit (4) to the main printed circuit board (16).

13. The method (S30) of manufacturing a battery module (20) according to item 12, wherein the method (S30) comprises removing (S36) the coating (8) from the tail (14) of the conductor unit (4) prior to the step of connecting (S37) the tail (14) of the conductor unit (4) to the main printed circuit board (16).

LIST OF REFERENCES

2 Battery
4 Conductor unit
6 Conductive adhesive
8 Coating
10 Battery module
12 Battery component
14 Tail
16 Main printed circuit board
18 Soldered portion
20 Hearing device
21 Components
S30 Method
S31 Connecting the conductive adhesive 6 to the battery 2
S32 Connecting the conductor unit 4 to the conductive adhesive 6
S33 Connecting the conductor unit 4 to the conductive adhesive 6
S34 Activating the conductive adhesive 6
S35 Coating the battery component 12
S36 Removing a coating 8 from the tail 14 of the conductor unit 4
S37 Connecting the tail 14 of the conductor unit 4 to the main printed circuit board 16

The invention claimed is:

1. A hearing device comprising a battery module, the battery module comprising:
a battery for powering the hearing device;
a conductor unit configured to provide electrical connection to the battery;
a conductive adhesive between the battery and the conductor unit, the conductive adhesive connecting the conductor unit to the battery, wherein the battery, the conductor unit, and the conductive adhesive form a battery component; and
a coating provided at least partly around the battery component;
wherein the conductor unit comprises a first electrical contact configured to electrically couple with a first terminal of the battery, a second electrical contact configured to electrically coupled with a second terminal of the battery, and a portion coupled between the first electrical contact and the second electrical contact, and wherein the portion of the conductor unit is covered by the coating;
wherein the hearing device comprises a housing, and wherein the coating of the battery module is inside the housing of the hearing device; and
wherein the conductor unit also comprises another portion coupled to the first electrical contact, and wherein the portion and the other portion correspond respectively to opposite sides of the first electrical contact.

2. The hearing device according to claim 1, wherein the coating is configured to protect the battery component and to fixate the battery component.

3. The hearing device according to claim 1, wherein the coating comprises a polymer deposited onto the battery component.

4. The hearing device according to claim 1, wherein the conductive adhesive comprises conductive components in an adhesive material.

5. The hearing device according to claim 1, wherein the conductive adhesive is at least on the first terminal and/or the second terminal of the battery such that the conductor unit becomes connected at least to the first terminal and/or the second terminal of the battery via the conductive adhesive.

6. The hearing device according to claim 5, wherein the portion of the conductor unit extends between the first terminal and second terminal.

7. The hearing device according to claim 1, wherein the first electrical contact of the conductor unit comprises a first pad configured to electrically couple with the first terminal of the battery, and the second electrical contact of the conductor unit comprises a second pad configured to electrically couple with the second terminal of the battery.

8. The hearing device according to claim 7, wherein the coating covers the first pad and the second pad.

9. The hearing device according to claim 1, wherein the portion of the conductor unit extends underneath the coating and along a side of the battery that is between the first terminal and the second terminal of the battery.

10. The hearing device according to claim 1, wherein the first electrical contact, the second electrical contact, and the portion of the conductor unit form a C-shape structure covered by the coating.

11. The hearing device of claim 1, wherein one or each of the first and second electrical contacts extends across a majority of a cross-sectional width of the battery.

12. A hearing device comprising a battery module, the battery module comprising:
- a battery for powering the hearing device;
- a conductor unit configured to provide electrical connection to the battery;
- a conductive adhesive between the battery and the conductor unit, the conductive adhesive connecting the conductor unit to the battery, wherein the battery, the conductor unit, and the conductive adhesive form a battery component; and
- a coating provided at least partly around the battery component;
- wherein the conductor unit comprises a first electrical contact for electrical coupling with a first terminal of the battery, a second electrical contact for electrical coupling with a second terminal of the battery, and a portion coupled between the first and second electrical contacts, wherein the hearing device comprises a printed circuit board; and
- wherein the conductor unit also comprises another portion coupled to the first electrical contact, and wherein the portion and the other portion correspond respectively to opposite sides of the first electrical contact.

13. The hearing device according to claim 12, wherein the printed circuit board comprises a battery printed circuit board.

14. The hearing device according to claim 12, wherein the printed circuit board comprises a main printed circuit board of the hearing device.

15. The hearing device according to claim 12, wherein the printed circuit board comprises a first main panel, a second main panel, and a flexible board, wherein the first main panel and the second main panel are connected via the flexible board.

16. The hearing device according to claim 12, wherein the printed circuit board comprises a charging component.

17. The hearing device according to claim 12, wherein the portion of the conductor unit is covered by the coating.

18. The hearing device according to claim 12, wherein the first electrical contact comprises a first pad, and wherein the second electrical contact comprises a second pad.

19. The hearing device according to claim 18, wherein the coating covers the first pad and the second pad.

20. The hearing device of claim 12, wherein one or each of the first and second electrical contacts extends across a majority of a cross-sectional width of the battery.

21. A hearing device comprising a battery module, the battery module comprising:
- a battery for powering the hearing device;
- a conductor unit configured to provide electrical connection to the battery;
- a conductive adhesive between the battery and the conductor unit, the conductive adhesive connecting the conductor unit to the battery, wherein the battery, the conductor unit, and the conductive adhesive form a battery component; and
- a coating provided at least partly around the battery component;
- wherein the conductor unit comprises a first electrical contact configured to electrically couple with a first terminal of the battery, and a second electrical contact configured to electrically coupled with a second terminal of the battery, and wherein the first electrical contact and the second electrical contact of the conductor unit are covered by the coating; and
- wherein the conductor unit also comprises a portion coupled between the first electrical contact and the second electrical contact, and another portion coupled to the first electrical contact, and wherein one or each of the first and second electrical contacts extends across a majority of a width of a cross-section of the battery, wherein the width is along a direction that is perpendicular to an axis extending through a center of the battery, and extending between the first terminal and the second terminal of the battery.

22. The hearing device of claim 21, wherein the portion and the other portion correspond respectively to opposite sides of the first electrical contact.

* * * * *